United States Patent Office 2,780,657
Patented Feb. 5, 1957

2,780,657
PROCESS FOR PREPARING AROMATIC NITRO COMPOUNDS

William G. Toland, Jr., San Rafael, Calif., assignor to California Research Corporation, San Francisco, Calif., a corporation of California No Drawing. Application January 4, 1954,
Serial No. 402,142

8 Claims. (Cl. 260—645)

This invention relates to a process for preparing organic nitro compounds. More particularly, the invention is concerned with a novel method for the production of useful nitro aromatic hydrocarbons.

Nitro aromatic hydrocarbons such as nitrobenzene are valuable intermediates for the production of dyes and other chemicals.

I have now found that aromatic nitro compounds can be prepared by a process which comprises heating an aromatic carboxylic acid and an inorganic nitrate to a temperature above about 175° C.

Such aromatic carboxylic acids may be any aromatic, alkyl aromatic or cycloalkyl aromatic carboxylic acid including the mononuclear and polynuclear types of fused and isolated rings. Examples of suitable aromatic carboxylic acids of these types include those carboxylic acids characterized by hydrocarbon groups corresponding to benzene, diphenyl, terphenyl, naphthalene, anthracene, phenanthrene, indan, indene, indacene, toluene, xylene, ethyl benzene, cumene, tertiary butyl benzene, paracymene, cyclohexyl benzene, dodecyl benzene, diphenyl methane and triphenyl methane. The aromatic carboxylic acids having hydrocarbon groups corresponding to diphenyl, terphenyl, naphthalene, anthracene, phenanthrene, and particularly benzene and t-butyl benzene are preferred.

Although heavy metal nitrates are preferred, any inorganic nitrate may be suitably employed in the reaction.

The reaction is carried out at elevated temperatures above about 175° C. In the preferred operation, the temperatures should not exceed the critical point of the aromatic acid. Temperatures of 175 to 375° C. and particularly those from 260 to 360° C. are most satisfactory.

Solvents may also be employed in the reaction but are not considered essential.

As a further illustration of the invention, the following examples are submitted. The proportions given are on a weight basis unless otherwise specified.

Example 1

15 parts by weight of benzoic acid were added to a glass distillation flask equipped with a side arm outlet and condenser. The benzoic acid was heated to reflux and 5 parts by weight of powdered silver nitrate were then added over a two-hour period. Foaming, indicating the formation of lower boiling materials, accompanied each addition of powdered silver nitrate. The lower boiling materials were gradually distilled off. Some oxides of nitrogen were evolved. The distillation was continued until solids collected in the side arm of the distillation flask.

The distillate contained the reaction products in two layers. The bottom layer was water with some dissolved organic material, and the top organic layer included nitrobenzene and benzoic acid. A small proportion of the organic layer was transferred to a test tube and dried with anhydrous calcium sulfate. The dried material possessed a boiling point of about 209° C. and gave off the characteristic odor of nitrobenzene.

Example 2

Following the technique of Example 1, copper nitrate ($Cu(NO_3)_2 \cdot 3H_2O$) was substituted for the silver nitrate, and again nitrobenzene was obtained.

Example 3

Following the technique of Example 1, nickel nitrate ($Ni(NO_3)_2 \cdot 6H_2O$) was substituted for the silver nitrate, and again nitrobenzene was found.

Example 4

Following the same technique as in Example 1, cobalt nitrate ($Co(NO_3)_2 \cdot 6H_2O$) was used in place of silver nitrate, and nitrobenzene was produced.

Example 5

Following the same technique as in Example 1, sodium nitrate ($NaNO_3$) was used in place of silver nitrate, and nitrobenzene was obtained. In this case, the rate of reaction was noted to be somewhat slower than with the heavy metal nitrates.

Example 6

A mixture of 5 parts of p-t-butylbenzoic acid and 0.1 part of $Ni(NO_3)_2 \cdot 6H_2O$ was heated to 200 to 250° C. and small portions of sodium nitrate ($NaNO_3$) added over 30 minutes until a total of one part had been added. After an hour of continued heating, evolution of oxides of nitrogen had ceased. Droplets of mononitro-t-butylbenzene collected on the reflux condenser. The main portion of the nitrated product was recovered by adding aqueous caustic to the reaction mixture to dissolve all unconverted carboxylic acid as the sodium salt and steam distilling. The mononitro-t-butylbenzene was collected as an oil in the condensate.

The process can also be carried out continuously as well as batchwise. In the preferred practice of the invention, the process is operated to give low conversions per pass and the unconverted aromatic acid recycled. Overoxidation of the product is thus avoided and higher yields are obtained.

Inorganic salt residues may be recovered and reconverted to the inorganic nitrates and again used in the process.

I claim:

1. A process for preparing a nitrated aromatic compound which comprises heating an aryl carboxylic acid and a metal nitrate to a temperature above about 175° C.

2. A process for preparing nitrobenzene which comprises heating benzoic acid and a metal nitrate to a temperature in the range from 175 to 375° C.

3. A process for preparing nitrobenzene which comprises heating benzoic acid, silver nitrate and water to a temperature in the range from 260 to 360° C.

4. A process for preparing nitrobenzene which comprises heating benzoic acid, copper nitrate and water to a temperature in the range from 260 to 360° C.

5. A process for preparing nitrobenzene which comprises heating benzoic acid, nickel nitrate and water to a temperature in the range from 260 to 360° C.

6. A process for preparing nitrobenzene which comprises heating benzoic acid, cobalt nitrate and water to a temperature in the range from 260 to 360° C.

7. A process for preparing nitrobenzene which comprises heating benzoic acid, sodium nitrate and water to a temperature in the range from 260 to 360° C.

8. A process for preparing mononitro-t-butylbenzene which comprises heating t-butylbenzoic acid and a metal nitrate to a temperature in the range from 175 to 375° C.

References Cited in the file of this patent

Backarach: J. Am. Ch. Soc., vol. 49, 1522–7 (1927). Copy in Sci. Library.